United States Patent
Kleine et al.

(10) Patent No.: US 11,829,911 B2
(45) Date of Patent: Nov. 28, 2023

(54) RESOURCE SCORING AND RECOMMENDATION SYSTEM

(71) Applicant: Optum Services (Ireland) Limited, Dublin (IE)

(72) Inventors: Hendrik Kleine, Dublin (IE); Vicente Rubén Del Pino Ruiz, Dublin (IE)

(73) Assignee: OPTUM SERVICES (IRELAND) LIMITED, Dublin (IE)

( * ) Notice: Subject to any disclaimer, the term of this patent is extended or adjusted under 35 U.S.C. 154(b) by 43 days.

(21) Appl. No.: 16/870,630

(22) Filed: May 8, 2020

(65) Prior Publication Data
US 2021/0350171 A1 Nov. 11, 2021

(51) Int. Cl.
| | |
|---|---|
| *G06Q 10/06* | (2023.01) |
| *G06Q 10/0631* | (2023.01) |
| *G06F 9/50* | (2006.01) |
| *H04L 67/306* | (2022.01) |
| *H04L 67/52* | (2022.01) |
| *G06F 18/22* | (2023.01) |

(52) U.S. Cl.
CPC ... *G06Q 10/063112* (2013.01); *G06F 9/5077* (2013.01); *G06F 18/22* (2023.01); *H04L 67/306* (2013.01); *H04L 67/52* (2022.05)

(58) Field of Classification Search
CPC ..... G06K 9/6215; G06F 9/5077; H04L 67/18; H04L 67/306
See application file for complete search history.

(56) References Cited

U.S. PATENT DOCUMENTS

| | | | |
|---|---|---|---|
| 6,487,539 B1 | 11/2002 | Aggarwal et al. | |
| 8,694,514 B2 | 4/2014 | Frieden et al. | |
| 8,977,584 B2 | 3/2015 | Jerram et al. | |
| 10,169,743 B2 | 1/2019 | Castel et al. | |
| 10,687,113 B2* | 6/2020 | Kegel | H04N 21/251 |
| 10,949,432 B1* | 3/2021 | Grayson | G06F 16/9035 |
| 11,698,782 B2* | 7/2023 | Nucci | H04Q 9/02 |
| | | | 717/171 |
| 2006/0277341 A1* | 12/2006 | Johnson | G06F 21/6227 |
| | | | 710/200 |
| 2007/0233536 A1 | 10/2007 | Johnson et al. | |
| 2014/0236664 A1* | 8/2014 | Zenger | G06F 16/24535 |
| | | | 705/7.27 |
| 2014/0358606 A1 | 12/2014 | Hull | |

(Continued)

FOREIGN PATENT DOCUMENTS

WO 2013136308 A1 9/2013

OTHER PUBLICATIONS

International Search Report and Written Opinion of International Application No. PCT/IB2021/053877, dated Jul. 14, 2021, 12 pp.

(Continued)

*Primary Examiner* — Eyob Hagos
(74) *Attorney, Agent, or Firm* — Shumaker & Sieffert, P.A.

(57) ABSTRACT

A computing device includes a memory and processing circuitry. The memory is configured to store an organizational proximity dataset for a current user. The processing is configured to generate scores for a plurality of resources based on the organizational proximity dataset stored to the memory for the current user. The processing circuitry is further configured to recommend one or more resources of the plurality of resources to the current user based on the scores generated for the plurality of resources.

15 Claims, 4 Drawing Sheets

(56) References Cited

U.S. PATENT DOCUMENTS

| | | | |
|---|---|---|---|
| 2015/0025928 A1* | 1/2015 | Kang | G06Q 10/063112 |
| | | | 705/7.14 |
| 2015/0242619 A1* | 8/2015 | Bender | H04L 63/10 |
| | | | 726/22 |
| 2015/0269488 A1* | 9/2015 | Galai | G06Q 30/02 |
| | | | 706/11 |
| 2015/0317753 A1* | 11/2015 | Goel | G06Q 10/1053 |
| | | | 705/319 |
| 2018/0096077 A1 | 4/2018 | Srivastava | |
| 2018/0300324 A1* | 10/2018 | Ziraknejad | G06N 20/00 |
| 2019/0258722 A1* | 8/2019 | Guo | G06F 16/9024 |
| 2020/0233917 A1* | 7/2020 | Kurtanovic | G06F 16/9538 |

OTHER PUBLICATIONS

International Preliminary Report on Patentability from International Application No. PCT/IB2021/053877 dated Nov. 17, 2022, 9 pp.

\* cited by examiner

RESOURCE SCORING AND RECOMMENDATION SYSTEM

TECHNICAL FIELD

This disclosure relates to recommendation generation systems, such as systems that select and recommend particular resources to a given individual.

BACKGROUND

Various entities, such as enterprises, educational institutions, government agencies, etc. maintain repositories of various resources. Some such entities implement recommendation systems configured to select resources to recommend to a particular (e.g. currently active) user. The recommendation systems may select resources for recommendation to users within the organization, or to external users, such as to customers or content consumers. As the variety of resources from which to select becomes increasingly rich, recommendation systems tend to evaluate more and more voluminous repositories at each instance of generating a user-targeted recommendation.

SUMMARY

Common examples of rich resource repositories are business intelligence (BI) resource repositories that are shared internally and/or externally by various enterprises. BI resources and other types of resources (collectively, "resources") are being created and shared in/by many enterprises at a faster rate than before (e.g., including over 100,000 resources with new resources being added daily in some enterprises). The rate of increase in resource sharing is a result of lower operating costs of resource generation/consumption capabilities, as well as usability improvements in user-facing software lowering the skill level required to create new resources. The potentially large number of resources to choose from causes end users to expend computing resources to identify the resource best suited to the usage need at a given time. The resource and time expenditure for each resource selection transaction often causes the end user to revert to previously used resources and/or rely on recommendations from other user(s).

However, such a trend of restrained resource consumption may diminish data precision with respect to organizational decision making. For example, decision makers may rely on outdated information, inaccurate information, information that conflicts with that reported on in other resources, or information that is unavailable to or went unconsidered by other parties involved in the same decision or related decision(s). In turn, this diminishment in data precision may negatively impact various quality metrics associated with the enterprise.

Systems of this disclosure are configured to generate user-targeted resource recommendations using a previously executed analysis of an enterprise's organizational network. In some examples, the systems of this disclosure may tune the resource recommendation based on behavioral analysis data gathered for the current user and/or quality metrics gathered for the resources being evaluated for the recommendation. In comparison to industry-prevalent recommendation systems that rely on content-based or collaborative resource evaluations, the recommendation systems of this disclosure are less compute resource-intensive. The systems of this disclosure also provide improved data precision (in the form of user-targeted resource recommendations) and faster recommendation turnaround times as compared to industry-prevalent recommendation systems, thereby potentially providing performance enhancements.

In one example, this disclosure describes a method. The method includes obtaining, by a computing system, for each respective user of a plurality of users, an organizational proximity dataset for the respective user. The organizational proximity data set for a current user (of the plurality of users) describes organizational similarity between a current user and one or more other people within an organization based on one or more of: (i) degrees of separation between the respective user and each of the one or more other people, (ii) respective geographic locations associated with the respective user and the one or more other people, (iii) tenure information for the respective user and the one or more other people with respect to the organization, or (iv) security clearance status information for the respective user and the one or more other people. The method further includes generating, by the computing system, for each respective user of the plurality of users, scores for a plurality of resources based on the organizational proximity dataset for the respective user. The method further includes recommending, by the computing system, for each respective user of the plurality of users, one or more of the resources to the respective user based on the scores for the plurality of resources.

In another example, this disclosure describes a computing system that includes a memory and processing circuitry in communication with the memory. The memory is configured to store, for each respective user of a plurality of users, an organizational proximity dataset for a current user, wherein the organizational proximity data set for the current user of the plurality, the organizational proximity data describing organizational similarity between the current user and one or more other people within an organization based on one or more of: (i) degrees of separation between the current user and each of the one or more other people, (ii) respective geographic locations associated with the current user and the one or more other people, (iii) tenure information for the current user and the one or more other people with respect to the organization, or (iv) security clearance status information for the current user and the one or more other people. The processing circuitry is configured to generate scores for a plurality of resources based on the organizational proximity dataset stored to the memory for the current user. The processing circuitry is further configured to recommend one or more resources of the plurality of resources to the current user based on the scores generated for the plurality of resources.

In another example, this disclosure describes an apparatus including means for obtaining, for each respective user of a plurality of users, an organizational proximity dataset for the respective user. The organizational proximity data set for a current user (of the plurality of users) describes organizational similarity between a current user and one or more other people within an organization based on one or more of: (i) degrees of separation between the respective user and each of the one or more other people, (ii) respective geographic locations associated with the respective user and the one or more other people, (iii) tenure information for the respective user and the one or more other people with respect to the organization, or (iv) security clearance status information for the respective user and the one or more other people. The apparatus further includes means for generating, for each respective user of the plurality of users, scores for a plurality of resources based on the organizational proximity dataset for the respective user. The apparatus further includes means for recommending, for each respective user of the plurality of users, one or more of the resources to the respective user based on the scores for the plurality of resources.

In another example, this disclosure describes a non-transitory computer-readable storage medium encoded with instructions that, when executed, cause processing circuitry of a computing system to perform operations. The operations include obtaining, for each respective user of a plurality of users, an organizational proximity dataset for the respective user. The organizational proximity data set for a current user (of the plurality of users) describes organizational similarity between a current user and one or more other people within an organization based on one or more of: (i) degrees of separation between the respective user and each of the one or more other people, (ii) respective geographic locations associated with the respective user and the one or more other people, (iii) tenure information for the respective user and the one or more other people with respect to the organization, or (iv) security clearance status information for the respective user and the one or more other people. The operations further include generating, for each respective user of the plurality of users, scores for a plurality of resources based on the organizational proximity dataset for the respective user. The operations further include recommending, for each respective user of the plurality of users, one or more of the resources to the respective user based on the scores for the plurality of resources.

The details of one or more examples of the disclosure are set forth in the accompanying drawings and the description below. Other features, objects, and advantages of the disclosure will be apparent from the description and drawings, and from the claims.

DETAILED DESCRIPTION

Resource recommendation systems of this disclosure are configured to generate user-targeted resource recommendations in a compute resource-saving and time-saving way, while improving data precision in the form of recommendation accuracy. The resource recommendation systems of this disclosure leverage previously executed analyses of an enterprise's organizational network to score resources based on an organizational mapping of the current user with respect to past users, whether still active or not, within the organization. The resource recommendation systems of this disclosure may further improve data precision by tuning individual resource recommendations based on behavioral analysis data gathered for the current user. In some examples, the resource recommendation systems of this disclosure may further improve data precision by tuning individual resource recommendations based on quality metrics gathered for the resources being evaluated for the recommendation. In various use case scenarios, the resource recommendation systems of this disclosure may tune recommendations using one or both of the behavioral analysis data and/or the resource quality metric(s), depending on availability and weighting (importance) assigned to these supplemental data sets.

Figure 1:
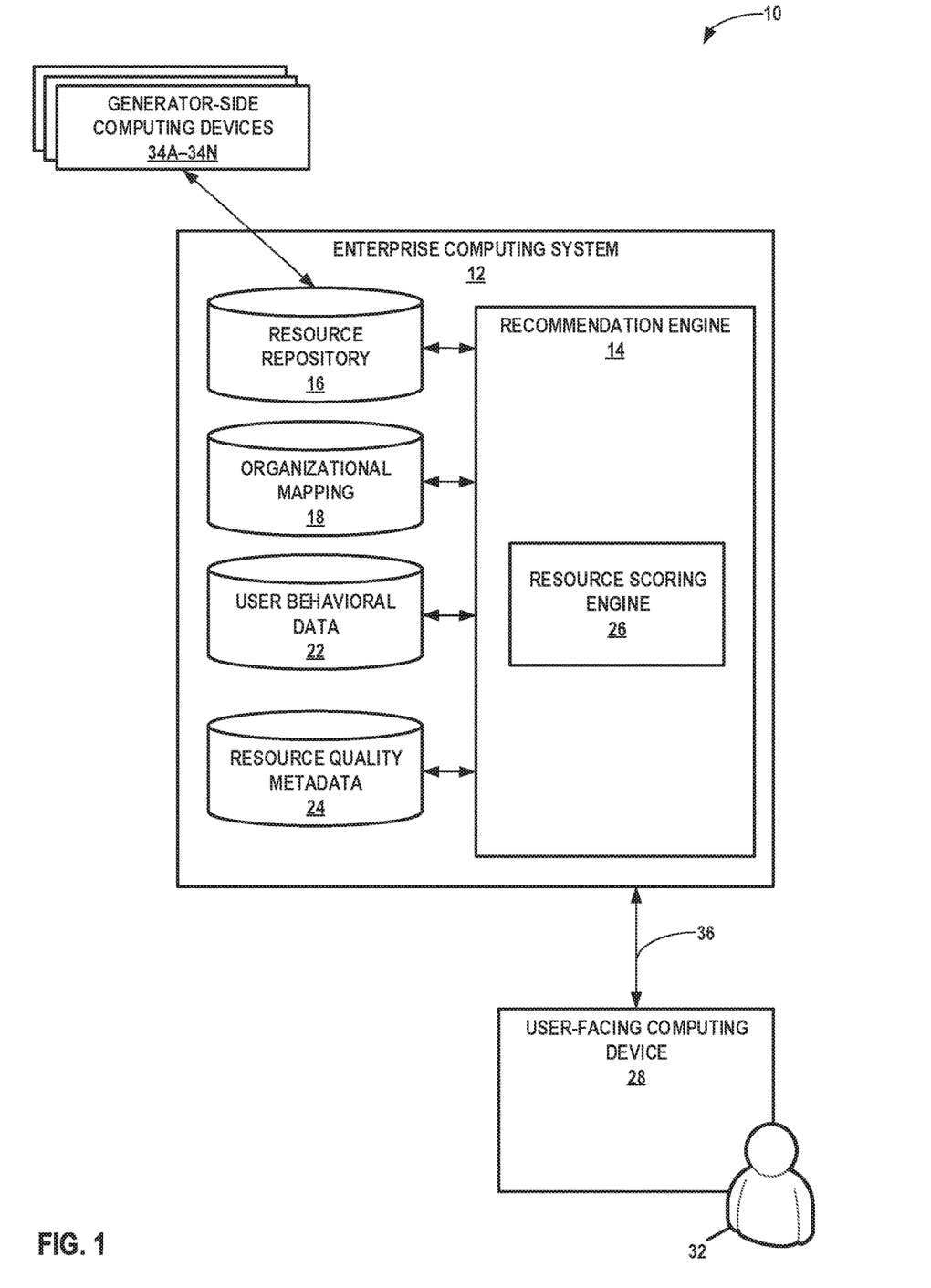
FIG. 1 is a block diagram illustrating an example resource recommendation system that includes various computing hardware components that generate individual resource recommendations in accordance with one or more aspects of this disclosure.

FIG. 1 is a block diagram illustrating an example resource recommendation system 10 that includes various computing hardware components that generate individual resource recommendations in accordance with one or more aspects of this disclosure. In the example of FIG. 1, resource recommendation system 10 includes enterprise computing system 12, which is communicatively coupled to user-facing computing device 28 and to one or more generator-side computing devices 34A-34N (collectively, "generator-side computing devices 34"). While resource recommendation system 10 is shown in FIG. 1 as including a single user-facing computing device 28 purely for ease of illustration and discussion, it will be appreciated that, in many use case scenarios, resource recommendation system 10 may include numerous user-facing computing devices. The number of user-facing computing devices supported by enterprise computing system 12 is scalable (e.g., sometimes numbering in tens of thousands or hundreds of thousands) to support enterprises of various sizes and/or end-user computing needs. In some examples, user-facing computing device 28 may also be one of generator-side computing devices 34.

Enterprise computing system 12 may represent one computing device or an interconnected grouping of multiple computing devices, in various examples. In examples where enterprise computing system 12 includes two or more computing devices, the computing devices of enterprise computing system 12 may function collaboratively as a single system. Computing device(s) represented by enterprise computing system 12 may include one or more of server devices, mainframes, personal computers, intermediate network devices, data storage devices, and so on. In examples in which enterprise computing system 12 includes two or more networked computing devices, the computing devices of enterprise computing system 12 may be geographically distributed, or may be substantially collocated (e.g., within a single data center).

In the example use cases described herein, enterprise computing system 12 represents a back-end computing system or support system, such as one or more servers housed within a data center. In contrast, user-facing computing device 28 and generator-side computing devices 34 represent front-end computing devices, such as employee computing terminals and/or computing devices (traditional or mobile) that connect to enterprise computing system 12 in a secure manner, such as via tunneling via a virtual private network (VPN). For example, a user-facing computing device may include, be, or be part of a personal computer (e.g., desktop computer, laptop computer, netbook, etc.), mobile device (e.g., tablet computer, smartphone, personal digital assistant, etc.), or any other electronic device configured to provide end-user computing capability, such as by presenting resources in a human-understandable form (e.g., legible, audible, etc.).

This disclosure primarily describes examples in which a single employee of an organization/entity (e.g., a business, a commercial enterprise, a governmental organization or agency, an educational institution, an association of professionals, etc.) that controls enterprise computing system 12 uses user-facing computing device 28 uses while conducting a commercial transaction with a customer, consumer, or client of the business. The employee who uses user-facing computing device 28 is shown in FIG. 1 as user 32. Among other uses, user 32 may utilize user-facing computing device 28 to consume various resources, such as business intelligence (BI) resources. User-facing computing device 28 may acquire resources from enterprise computing system 12 actively or passively, via communicative connection 36.

In the example of FIG. 1, enterprise computing system 12 includes various data stores, including resource repository 16, organizational mapping 18, user behavioral data 22, and resource quality metadata 24. The data stores shown as being part of enterprise computing system 12 in FIG. 1 are non-static, in that these data stores can be updated via addition, deletion, or editing of the stored data. While shown as being implemented locally within the hardware infrastructure of enterprise computing system 12 as a non-limiting example, it will be appreciated that, in other examples, one or more of resource repository 16, organizational mapping 18, user behavioral data 22, or resource quality metadata 24 may be implemented externally to the hardware infrastructure of enterprise computing 12, while remaining accessible with up-to-date data via communicative connection(s) to enterprise computing system 12.

As shown in FIG. 1, enterprise computing system 12 includes recommendation engine 14. Enterprise computing system 12 may invoke recommendation engine 14 to recommend one or more specific resources (available from resource repository) to user 32 for consumption via user-facing computing device 28. Recommendation engine 14 is configured to obtain an organizational proximity dataset (from organizational mapping 18) for user 32. The organizational proximity dataset for user 32 describes organizational similarity between user 32 and one or more other people within the organization that controls enterprise computing system 12. For example, recommendation engine 14 may invoke scoring engine 26 to generate scores for each of one or more resources available from resource repository 16 based on the organizational proximity dataset obtained from organizational mapping 18 with respect to user 32.

In obtaining the organizational proximity dataset for user 32, recommendation engine 14 may determine the organizational proximity (or organizational similarity) between user 32 and the other people of the organization based on one or more of: (i) degrees of separation between user 32 and each of the one or more other people in the organization; (ii) respective geographic locations associated with user 32 and the one or more other people; (iii) tenure information for user 32 and the one or more other people with respect to their respective times of service at the organization; or (iv) security clearance status information for user 32 and the one or more other people. Recommendation engine 14 may obtain the organizational proximity dataset for user 32 without requiring user 32 to enter the information manually at every instance of recommending a resource from resource repository 16 to user 32. Instead, recommendation engine 14 may obtain the organizational dataset and determine the organizational similarity information for user 32 based on the previously analyzed data available from organizational mapping 18.

The degree of separation between user 32 and each of the one or more other people evaluated quantifies the proximity-based effect of how closely the users work together and collaborate with respect to the areas of their daily tasks. The degree-of-separation calculation between user 32 and the one or more other people in the organization can be represented in the form of a graph (e.g., using two-dimensional or three-dimensional Cartesian coordinates). The calculation of the degree of separation between user 32 and another person (denoted by the variable names 'U1' and 'U2' respectively) is shown in equation (1) below:

$$D(U1, U2) = \frac{nV(N(U1), N(U2))}{lD} \quad (1)$$

Each user (namely, user 32 and each of the one or more other people in the organization to whom the degrees of separation are being calculated) is represented as a node in the organizational mapping, and the vertex connecting a given pair of users is the relation of management between those two users. In order to calculate the distance between two users, recommendation engine 14 may traverse the organizational mapping (which may be viewed as a graph) to obtain a number of steps taken to traverse between the two corresponding nodes on the shortest path available. For example, recommendation engine 14 may determine the degrees of separation between the current user (user 32 in this case) and each of the one or more other people based on respective numbers of vertices (e.g., a number of hops) between the current user and each of the one or more people according to organizational mapping 18. Table 1 below serves as a key or legend with respect to the variables used in equation (1) above:

TABLE 1

| Sign | Meaning |
| --- | --- |
| U1 | User 1 |
| U2 | User 2 |
| nV(X, Y) | Number of vertices (e.g., number of direct hops) between X and Y (with 'X' and 'Y' being U1 and U2 in this example |
| N(X) | Node where 'X' represents the respective user |
| D | Degrees of Separation |
| lD | Longest distance between two users in the organization. |

As described above, recommendation engine 14 may also obtain respective geographic location information for user 32 and the one or more other people in the organization. In some examples, resource scoring engine 26 may draw a direct proportionality between the geographic locations (or closeness thereof) and the likelihood of resource selection correlation between multiple users. In these cases, the closer the respective geographic locations between user 32 and a particular person of the one or more other people evaluated, resource scoring engine 26 may assign a greater score to resource that a geographically proximate person used or approved in formulating a recommendation for user 32. For example, the geographic proximity between user 32 and the other person in the organization increases the likelihood that user 32 may collaborate with the other person and/or share professional interests in a given resource, such as a BI resource.

In some examples, resource scoring engine 26 may calculate the respective geographic distances between user 32 and each of the one or more other people evaluated in kilometers or other unit of distance, and may normalize the distances between offices and departments. In some examples, resource scoring engine 26 may determine the respective geographic distances from the current user (user 32 in this case) to each of the one or more other people based on the respective geographic locations associated with user 32 and the one or more other people. In some examples, resource scoring engine 26 may determine or fine-tune the respective geographic distances based on jurisdictional boundaries (e.g., country, state, local municipality, etc.), such as by assigning a closer proximity between Los Angeles and New York than between New York and Toronto, based on national boundaries in spite of greater mileage/kilometrage between the two. In other examples, resource scoring engine 26 may disregard jurisdictional boundaries in favor of distance "as the crow flies" (e.g., assigning a closer proximity between Toronto and New York than between New York and Los Angeles, based on mileage or kilometrage). In some examples, resource scoring engine 26 may normalize distance values based on the maximum distance between two offices of the organization. The calculation of the geographic distance between user 32 and any of the other people evaluated is shown in equation 2 below, and the variables of equation 2 are described in Table 2 below, which is a legend for equation 2:

$$GL(U1, U2) = \frac{\sqrt{(q1-p1)^2 + (q2-p2)^2}}{mD} \quad (2)$$

TABLE 2

| Sign | Meaning |
|---|---|
| Q(q1, q2) | Geographic location for user 1 |
| P(p1, p2) | Geographic location for user 2 |
| mD | Maximum distance between an organization's offices |
| GL | Geographic Location Proximity Score |

Recommendation engine 14 may also obtain tenure information for user 32 and the one or more other people with respect to their respective times of service at the organization. In some instances, recommendation engine 14 may draw a direct proportionality between the of a person's employment at the organization to the proximity between the person and user 32. For example, junior employees and senior employees may be interested in accessing or consuming different resources and/or data. To quantify the effect of tenure information on the resource consumption tendencies of different employees, resource scoring engine 26 may calculate a score between 0 and 1 using the difference in tenure between user 32 and each of the one or more other people being considered with respect to the current resource being evaluated for recommendation. For example, resource scoring engine 26 may calculate the score in the form of the differential in the number of days working at the same organization. In some examples, resource scoring engine 26 may calculate the percentage of the time working in the organization that both user 32 and the respective other person have overlapped. The calculation may, in some examples, be described as a tenure-targeted adaptation of a Jaccard Index calculation. The relative tenure calculation is represented by equation (3) below $$T(U1, U2) = \frac{\text{Min}(ND1, ND2)}{\text{Max}(ND1, ND2)} \quad (3)$$

Table 3 below is a key/legend for equation (3) and describes the variables shown in equation (3):

TABLE 3

| Sign | Meaning |
|---|---|
| ND1 | Tenure in organization measured as number of days, for user 1 |
| ND2 | Tenure in organization measured as number of days, for user 2 |
| T | Tenure Proximity Score |

As described above, recommendation engine 14 may also obtain security clearance status information for user 32 and the one or more other people. Recommendation engine 14 may form and use a quantification of how many security roles are shared (or contained within) as an indicator of proximity between employees. As described above, recommendation engine 14 draws a direct correlation between multiple employees' shared interest in the past in the same resource(s) and/or data and the likelihood that the same group of employees will share an interest in common resource(s) and/or data going forward. Recommendation engine 14 may utilize security clearance (or security access) information based on this correlation, based on a trend of sharing interest in the same resource(s) and/or data often translating to the same or similar security clearance/access status. To quantify the proximity between user 32 and each of the one or more other people from a security clearance and access perspective, recommendation engine 14 compares the security roles assigned to user 32 and each of the one or more other people. Recommendation engine 14 may calculate the security clearance/access-based employee proximity according to equation (4) below, with the variables of equation (4) being described in Table 4 below:

$$SA(U1, U2) = \frac{n(S1 \cap S2)}{n(S1 \cup S2)} \quad (4)$$

TABLE 4

| Sign | Meaning |
|---|---|
| S1 | Security Access Profile for User 1 |
| S2 | Security Access Profile for User 2 |
| SA | Security Access Proximity Score |

Upon obtaining the four metrics that are the results of equations (1) through (4) above, resource scoring engine 26 may converge the results to calculate a single score, referred to herein as an Organizational Proximity Score (OPS). In the convergence process, the degrees of separation and geographic location scores act as a counterbalance with respect to the scores from the tenure and security access calculations. Resource scoring engine 26 may calculate the final score (OPS) as a value between 0 and 1, with values of or closer to 1 indicating that the evaluated pair of users are closer from an organizational point of view, while values of or closer to 0 indicate that the evaluated pair of users are not related at all or are distantly related from an organizational point of view. Resource scoring engine 26 may calculate the final OPS according to equation (5) below, with the variables of equation (5) being described in Table 5 below:

$$OPS = T \cdot SA \cdot DD' \cdot GL' \quad (5)$$

TABLE 5

| Sign | Meaning |
| --- | --- |
| DD' | Degrees of Separation Proximity Score (1 − DD) |
| GL' | Geographic Location Proximity Score (1 − GL) |
| T | Tenure Proximity Score |
| SA | Security Access Proximity Score |
| OPS | Organizational Proximity Score |

In some examples, resource scoring engine 26 may customize the calculation of equation (5) to suit different scenarios by assigning individual weights (as multipliers) to one or more of the factors used in the OPS calculation of equation (5) above. In this way, recommendation engine 14 implements techniques of this disclosure to determine the organizational similarity between user 32 and one or more other people of the organization based on one or more of: (i) degrees of separation between user 32 and each of the one or more other people in the organization; (ii) respective geographic locations associated with user 32 and the one or more other people; (iii) tenure information for user 32 and the one or more other people with respect to their respective times of service at the organization; or (iv) security clearance status information for user 32 and the one or more other people.

Additionally, recommendation engine 14 invokes resource scoring engine 26 to generate individual scores for each of one or more resources available from resource repository 16 based on the organizational proximity dataset formed for user 32. Based on the scores calculated for and assigned to the scored resources, recommendation engine 14 recommends one or more of the scored resources to user 32. While FIG. 1 is illustrated and described with respect to a single user (user 32) and user device (user-facing computing device 28), it will be appreciated that the techniques of this disclosure are scalable to accommodate greater numbers of users. That is, user 32 represents one user out of a grouping of users for whom recommendation engine 14 generates resource recommendations based on individually formed organizational proximity datasets.

In this way, enterprise computing system 12 may be configured according to aspects of this disclosure to provide the technical improvements of (i) improved data precision, by recommending resource(s) to multiple users on an individually customized basis; (ii) a reduction in compute resource consumption, by reusing previously formed data from organizational mapping 18 to generate individual resource recommendations across multiple users; and (iii) computing time mitigation, by generating individual resource recommendations without requiring any steps to elicit user-specific input for the resource recommendations.

In some examples, recommendation engine 14 may fine-tune recommendations using one or both of behavioral analysis data (e.g., pertaining to past resource selection information for user 32 and/or for other people in the organization who are organizationally proximate to user 32) and/or quality metrics available for one or more of the resources of resource repository 16 under evaluation for recommendation to user 32. Recommendation engine 14 may quantify the behavioral proximity between user 32 and one or more other people in the organization is calculated depending on their respective past behaviors with respect to resource selection and/or consumption. Recommendation engine 14 may tune the behavioral proximity dataset based on one or more factors, such as influencer status (or lack thereof) of the various users whose past behavioral information is under analysis, the way(s) in which these users have used particular resources under evaluation for recommendation, etc.

To determine the "influence" aspect of behavioral metadata associated with a group of users, recommendation engine 14 evaluates data that is generally divided into two categories, namely, (i) viewer influence; and (ii) generator influence. Viewer influence pertains to the intra-organizational influence of other users whose past resource selection/usage information is extracted from user behavioral data 22 and evaluated as part of formulating a resource recommendation for user 32. The viewer influence status (or lack thereof) impacts the magnitude of a user's effect on a behavioral score that resource scoring engine 26 calculates with respect to a particular resource with respect to user 32. In some examples, resource scoring engine 26 may determine the viewer influence based on the organizational distance (e.g., as determined from organizational mapping 18) from an employee of the organization to the leader of the organization. For example, resource scoring engine 26 may determine the viewer influence based on organizational distance as determined by the number of vertices (e.g., a number of hops, as represented by individual intermediate members of the organization) from a given employee to the leader of the organization.

Various examples of this disclosure are described with respect to the leader of the organization being referred to as the "CEO" (chief executive officer) of the organization. It will be appreciated that, in other examples, depending on the hierarchical structure of the particular organization that is mapped in organizational mapping 18, the leader of the organization (with respect to whom the viewer influence of a particular user is determined) may have a title that is different from "CEO." The examples described below are based on an assumption of inverse proportionality between viewer influence magnitude and distance to the CEO. In other words, the closer an employee is to the CEO as determined by organizational mapping 18, the greater the influence the employee's behavior is likely to have on the organization by making decisions, and therefore, has a greater viewer influence metric with respect to recommendations formulated for user 32.

Recommendation engine 14 identifies the information (e.g., particular resources available from resource repository 16) that an employee utilizes in one or more decision-making processes, using data available from user behavioral data 22. Recommendation engine 14 calculates the organizational distance from the employee to the CEO using organizational mapping 18, and determines the level to which the resource selection/usage is influential with respect to the recommendation being formulated for user 32. Resource scoring engine 26 may calculate the viewer influence score in each instance of recommendation engine 14 accessing and evaluating data from user behavioral data 22 according to equation (6) below. Table 6 below is a legend for equation (6), describing several of the variables used in equation (6):

$$Iv(U) = \frac{nV(N(U), CEO(X))}{D} \qquad (6)$$

TABLE 6

| Sign | Meaning |
| --- | --- |
| CEO(X) | Node representing the organization leader/CEO |
| N(U) | Node representing the user U, whose influence is to be calculated |
| nV | Number of vertices between two nodes |
| D | Constant, defined as the number of hierarchical levels in an organization, e.g. depth. |

As described above, recommendation engine 14 may also factor the generator influence of a resource included in resource repository 16 into the recommendation being formulated for user 32. The generator influence of a resource is based on several different factors, such as the quality of the resource as created (e.g., by parties who use generator-side computing devices 34 to generate resources and upload the resources of resource repository 16), the number of viewers utilizing the resource(s) being evaluated, the impact the resource(s) are likely to have on decisions made by user 32, etc. Recommendation engine 14 may quantify the creator influence using a combination of discrete metrics, one of which is referred to herein as a "design quality" metric. For example, recommendation engine 14 may determine the design quality of a given resource based on adherence to certain design guidelines and/or predetermined design best practices.

One example of a design guideline is related to accessibility, such as a scale of colors adapted for users with certain visual impairments, e.g. any variety of color blindness. Another example of a design guideline is related to usability, such as using sizing and aspect ratios not bigger than the average size of a standard-issue monitor within the organization, thereby avoiding having users having to scroll left to right within a resource. Another example of a design guideline relates to the incorporation of charting guidelines set by a marketing department of the organization, including chart colors, fonts, font color, axis formatting, line formatting, etc. Another example of a design guideline relates to data visualization guidance set by the organization's "center of excellence," such as guidelines to the positioning of charts on a dashboard relative to other charts, sizing, aspect ratios, whitespaces, etc.

Design guideline adherence may be monitored and/or enforced by an expert committee in the organization, and the guidelines may be different across different organizations. For example, one organization may have an accepted set of colors for publications (enterprise logo, other portions' coloring, etc.) while another organization may implement a different set of accepted colors, based on internal committee preferences. Recommendation engine 14 may draw a direct proportionality between the percentage of guidelines followed and applied to the design of the resource to determine the measure of the design quality of the resource. Recommendation engine 14 may calculate the design quality according to equation (7) below, with Table 7 providing descriptions of several variables shown in equation (7):

$$Q(D) = \frac{n(G, D)}{N} \quad (7)$$

TABLE 7

| Sign | Meaning |
| --- | --- |
| Q(D) | Quality of Design |
| N | Total number of design guidelines |
| N(G, D) | Total number of design guidelines to which the resource adheres to |

Recommendation engine 14 may also include a resource impact quantity as factor in the generator influence determination. Recommendation engine 14 may adjust generator impact as a function of the number of views a resource receives, with an additional weighting factor being the number of viewers who affirmatively flag a particular resource as being "important" or as being a user "favorite." Because these values (and if available, flags) indicate how valued resource(s) developed by the particular generator are within the organization, recommendation engine 14 may skew the generator influence based on these factors. Recommendation engine 14 may calculate the resource impact portion of the generator influence of a resource according to equation (8) below, with several variables of equation 7 being described in Table 8 below:

$$I(A) = \frac{n(F(A))}{n(V(A))} \quad (8)$$

TABLE 8

| Sign | Meaning |
| --- | --- |
| I(A) | Impact of resource |
| N(V(A)) | Number of Views for the resource |
| N(F(A)) | Number of users who have flagged the resource as valuable (e.g. "favorited") |

To calculate the final score for generator influence, recommendation engine 14 may invoke resource scoring engine 14 to converge the various factors described above as a function of the design quality and resource impact for all of the resources being evaluated for possible recommendations to user 32. Resource scoring engine 26 may calculate the final score for generator influence according to equation (9) below, with several variables of equation (9) being described in Table 9 below:

$$Ic(U) = \sum \frac{Q(Ai)I(Ai)}{n} \quad (9)$$

TABLE 9

| Sign | Meaning |
| --- | --- |
| iC(U) | Impact of resource creator U |
| Q(Ai) | Quality of Design for resource 'i' |
| I(Ai) | Impact of resource 'i' |
| N | Number of resources created by creator U |

User behavioral data 22 may also include time measurements indicating the time spent by various users using one or more of the resources available from resource repository 16. The time measurements may be aggregates for a particular user-resource combination, a longest contiguous time for a particular user-resource combination, an average (e.g., mean, median, mode) time measurement for each instance of a particular user accessing a resource, etc. In some use case scenarios, recommendation engine 14 may draw a direct proportionality between the usefulness of a resource of resource repository 16 and the time spent on the resource by past user(s), particularly viewer influencers (e.g., employers who have a short organizational distance to the leader of the organization). For example, recommendation engine 14 may determine that a tendency of users spending only seconds viewing a report is an indication that the resource is unlikely to be the right resource to recommend to user 32. Conversely, recommendation engine 14 may determine that a resource is more valuable based on a tendency of users to spend more time viewing the resource. Recommendation engine 14 may invoke resource scoring engine to calculate the time-based score for a resource according to equation (10) below, with several of the variables of equation 10 being described in Table 10 below:

$$S(A, U) = \frac{nS(A, U)}{nS(U)} \qquad (10)$$

TABLE 10

| Sign | Meaning |
| --- | --- |
| S(A, U) | Score of resource 'A' by User U |
| nS(A, U) | Number of seconds spent in resource 'A' by User U |
| nV(U) | Total number of seconds spent in all resources by User U |

Resource scoring engine 26 may use the various behavioral proximity components represented by the score results calculated using equations (6)-(10) for each resource under evaluation to calculate a final behavioral proximity score. In some examples, resource scoring engine 26 may adjust the final behavioral proximity score based on Pearson Scores assigned to each of the evaluated resources. As used herein, a "Pearson Score" is a quantitative value indicative of the percentage share of a particular resource among the aggregate usage of all of the resources under evaluation. In various examples, resource scoring engine 26 may calculate the Pearson score (on a per-user basis) for a given resource based on a number of views, a number of visits, total time spent with the resource open, or other resource access-related metrics.

Resource scoring engine 26 may calculate the proximity between multiple users based on how the users assess similar (or sometimes identical) resources. The final score may be a value between −1 and 1, where 0 indicates no relation at all. Final scores closer to 1 may indicate a closer behavioral proximity between the evaluated users, while final scores closer to −1 may indicate a farther distance between the evaluated users in a behavioral sense. In some examples, resource scoring engine 26 may adjust or normalize the value calculated between two users to fall within a scale between 0 and 1 to enable integration of the score with the other scores described herein. Resource scoring engine 26 may perform the adjustment operation by adding one unit and dividing the final result by 2.

To calculate the final behavioral score, resource scoring engine 26 may converge the various scores calculated using equations (6)-(10). Once the viewer influence and behavioral proximity are determined, resource scoring engine 26 may calculate the final behavioral score according to equation (11) below, with variables of equation (11) being described in Table 11 below:

TABLE 11

| Sign | Meaning |
| --- | --- |
| BS | Behavior Score |
| BP | Behavioral Proximity Score |
| Iv' | Influence as a viewer (1 − Iv) |

In examples in which recommendation engine 14 fine-tunes resource recommendations based on quality metrics available for one or more of the resources of resource repository 16 under evaluation, recommendation engine 14 may quantify the quality of a resource and/or the resource's underlying data with respect to user 32 and the current resource-consumption needs being serviced. For example, recommendation engine 14 may use a measure of the quality of the data included in the resource and/or the design of a particular resource to determine the overall quality of the resource. Recommendation engine 14 may obtain the data quality and/or the design quality information from one or more repositories, such as resource quality metadata 24.

The data quality of a particular resource is likely to impact the resource's importance in user 32 formulating a business decision or solution using the resource. To mitigate or potentially eliminate sub-optimal decisions, which could have a cascading impact across an organization, recommendation engine 14 obtains, from resource quality metadata, quality information pertaining to the one or more resources being evaluated for recommendation to user 32. Recommendation engine 14 may invoke resource scoring engine 26 to calculate a data quality score between 1 (indicating poor quality) and 0 (indicating good quality). Resource scoring engine 26 may generate this score based on profiling information available via one or more data quality assessment tools available on the market. Resource scoring engine 26 may calculate the data quality score for a resource according to equation (12) below, with the variables of equation (12) being described in Table 12 below:

$$DQ(A) = mI(A)wT(A)O(A) \qquad (12)$$

TABLE 12

| Sign | Meaning |
| --- | --- |
| DQ(A) | Resource Data Quality |
| mI(A) | Percentage of missing information in resource |
| wT(A) | Percentage of rows with wrong type |
| O(A) | Percentage of outliers within the resource |

In some examples, recommendation engine 14 may add one or more additional data quality rules to improve or further refine the overall assessment of data quality of a resource. For instance, recommendation engine 14 may invoke resource scoring engine 26 to calculate a final resource score according to equation (13) below, which converges the data quality calculation yielded by equation (12) with the creator influence metric described above with respect to the behavioral proximity calculation. Table 13 describes the variables used in equation (13).

$$AS(A) = IC(U)DQ'(A) \qquad (13)$$

TABLE 13

| Sign | Meaning |
| --- | --- |
| AS(A) | Score of resource 'A' |
| IS(U) | Influence score of resource creator |
| DQ'(A) | Resource Data Quality Score (1 − DQ) |

Again, recommendation engine 14 may fine-tune the organizational proximity-based recommendation using one or both of the behavioral proximity data set and/or the data quality data set, depending on the availability of these supplemental data sets. In some examples, recommendation engine 14 may invoke resource scoring engine 26 to assign an individual weighting (based on an importance determination) to each of the datasets in the final convergence. The weightings may be applied in the form of multipliers that skew the effect of a particular data set upward or downward in the final convergence that forms a resource score in the recommendation ranking process.

Equation (14) below represents an example of convergence of the three data sets described above, with the output representing a "hybrid recommendation score." Table 14 below describes several of the variables shown in equation (14).

$$HRS(A) = w_1 BS(U) \cdot w_2 OPS(U) \cdot w_3 AS(A) \quad (14)$$

TABLE 14

| Sign | Meaning |
| --- | --- |
| HRS | Hybrid Recommendation System Score |
| A | BI Resource viewed by U |
| BS | Behavioral Proximity Score |
| OPS | Organizational Proximity Score |
| W1 | Weight for BS score (0.33 as default) |
| W2 | Weight for OPS Score (0.33 as default) |
| W3 | Weight for AS Score (0.33 as default) |
| AS | Resource Score |

Figure 2:
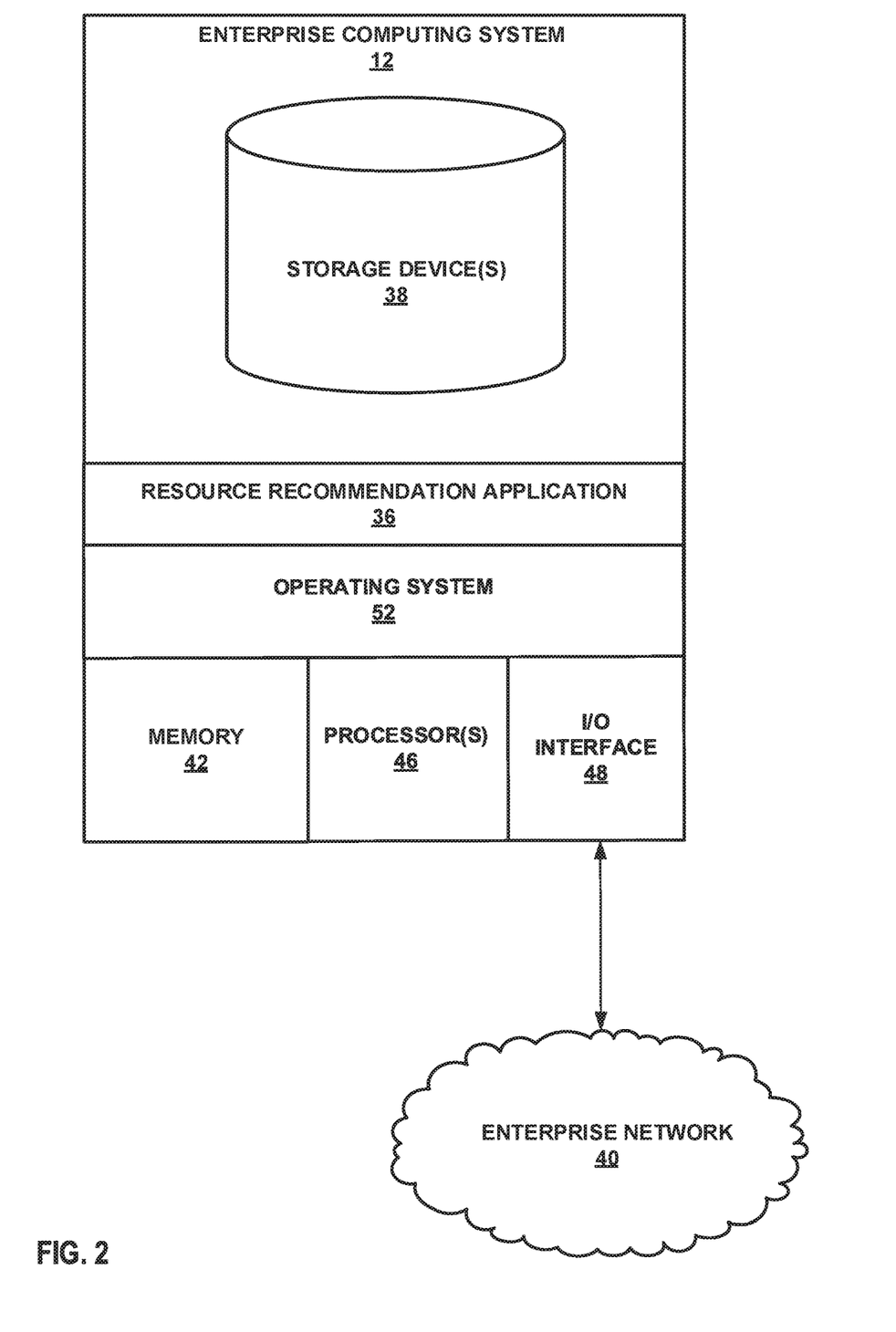
FIG. 2 is a block diagram illustrating an example implementation of the enterprise computing system of FIG. 1.

FIG. 2 is a block diagram illustrating an example implementation of enterprise computing system 12 of FIG. 1. In the example shown in FIG. 2, enterprise computing system 12 includes memory 42 and one or more processors 46 communicatively connected to memory 42. In some examples, memory 42 and processor(s) 46 may be integrated into a single hardware unit, such as a system on a chip (SoC). Each of processor(s) 46 may include, be, or be part of one or more of a multi-core processor, a controller, a digital signal processor (DSP), an application specific integrated circuit (ASIC), a field-programmable gate array (FPGA), processing circuitry (e.g., fixed-function circuitry, programmable circuitry, or any combination of fixed function circuitry and programmable circuitry) or equivalent discrete logic circuitry or integrated logic circuitry. Memory 42 may include any form of memory for storing data and executable software instructions, such as random-access memory (RAM), read only memory (ROM), programmable read only memory (PROM), erasable programmable read only memory (EPROM), electronically erasable programmable read only memory (EEPROM), and flash memory.

Memory 42 and processor(s) 46 provide a computer platform for executing operation system 52. In turn, operating system 52 provides a multitasking operating environment for executing software components, such as resource recommendation application 36 and/or other software components. As shown, processors 46 connect via an I/O interface 48 to external systems and devices, such as to one or more devices of or connected to enterprise network 40. Moreover, I/O interface 48 may incorporate network interface hardware, such as one or more wired and/or wireless network interface controllers (NICs) for communicating via enterprise network 40, which may represent a packet-based network.

Enterprise network 40 may represent a private network, which is characterized by a set of data-communicative connections within a specified secure environment within which various connectivity and/or authentication restrictions are established to promote a secured environment. In some examples, enterprise network 40 may also incorporate one or more connected devices that are in an active VPN session with enterprise computing system 12. VPN sessions, when active, allow employees to securely access, modify, or otherwise communicate with enterprise resources (e.g., the various data repositories of FIG. 1 and/or software applications of FIG. 2) over public networks. In this regard, the enterprise may deploy a VPN concentrator (or "VPN gateway") to provide secure access to the enterprise resources.

An employee using an end-user device (e.g., user-facing computing device 28) at a remote location may establish a VPN connection to the VPN gateway through a public network, such as the Internet, and thereby tunnel encrypted communications to and from enterprise computing system 12 in a secure manner. The use of a VPN may provide assurances that others on the public network cannot intercept, read, or reuse communications sent on the VPN. In this way, enterprise computing system 12 may implement the techniques of this disclosure using packetized communications that are secured by being entirely contained within the logical confines of enterprise network 40, whether by way of physical connections within the private network component of enterprise network 40, or by way of VPN tunneling-based encrypted communications securely communicated with enterprise computing system 12 over a public network.

Software components executing on enterprise computing system 12, such as resource recommendation application 36, represent executable software instructions that may take the form of one or more software applications, software packages, software libraries, hardware drivers, and/or Application Program Interfaces (APIs). Resource recommendation application 36 implements functionalities described above with respect to recommendation engine 14 (incorporating resource scoring engine 26) of FIG. 1. For example, upon detecting a particular stimulus, resource recommendation application 36 may invoke recommendation engine 14 to perform one or more of the operations described above with respect to FIG. 1.

Examples of stimuli that resource recommendation application 36 may use in order to invoke recommendation engine 14 include explicit user inputs received from user-facing computing device 28 over enterprise network 40 requesting a recommendation of a resource from resource repository 16, a detection of a resource browsing interface or resource viewing interface at user-facing computing device 28, a certain time period before a task deadline that might benefit from consultation of a resource from resource repository 16, etc. Upon detection of any such stimuli, resource recommendation application 36 may invoke recommendation engine 14 (and thereby, resource scoring engine 26) to perform the organizational proximity-based resource recommendation techniques (or hybrid recommendation techniques in scenarios in which the recommendation is fine-tuned using behavioral and/or resource quality information) described above with respect to FIG. 1. Resource recommendation application 36 may include, for example, one or more software packages, software libraries, hardware drivers, and/or Application Program Interfaces (APIs) for implementing various permutations and combinations of the functionalities described herein.

Resource recommendation application 36 may access and/or update various data repositories, such as the various data repositories illustrated in and described with respect to FIG. 1. In examples in which one or more of these data repositories are implemented locally at enterprise computing system 12, the locally implemented data repositories may be stored to one or more storage devices 38. Storage device(s) 38, in some examples, include one or more computer-readable storage media (e.g., non-transitory computer-readable media) and/or computer-readable storage devices. In some examples, storage device(s) 38 may be configured to store greater amounts of information than memory 204. Storage device(s) 38 may further be configured for long-term storage of information. In some examples, storage device(s) 38 include non-volatile storage elements. Examples of such non-volatile storage elements include magnetic hard discs, optical discs, solid-state discs, floppy discs, flash memories, forms of electrically programmable memories (EPROM) or electrically erasable and programmable memories, and other forms of non-volatile memories available commercially.

Figure 3:
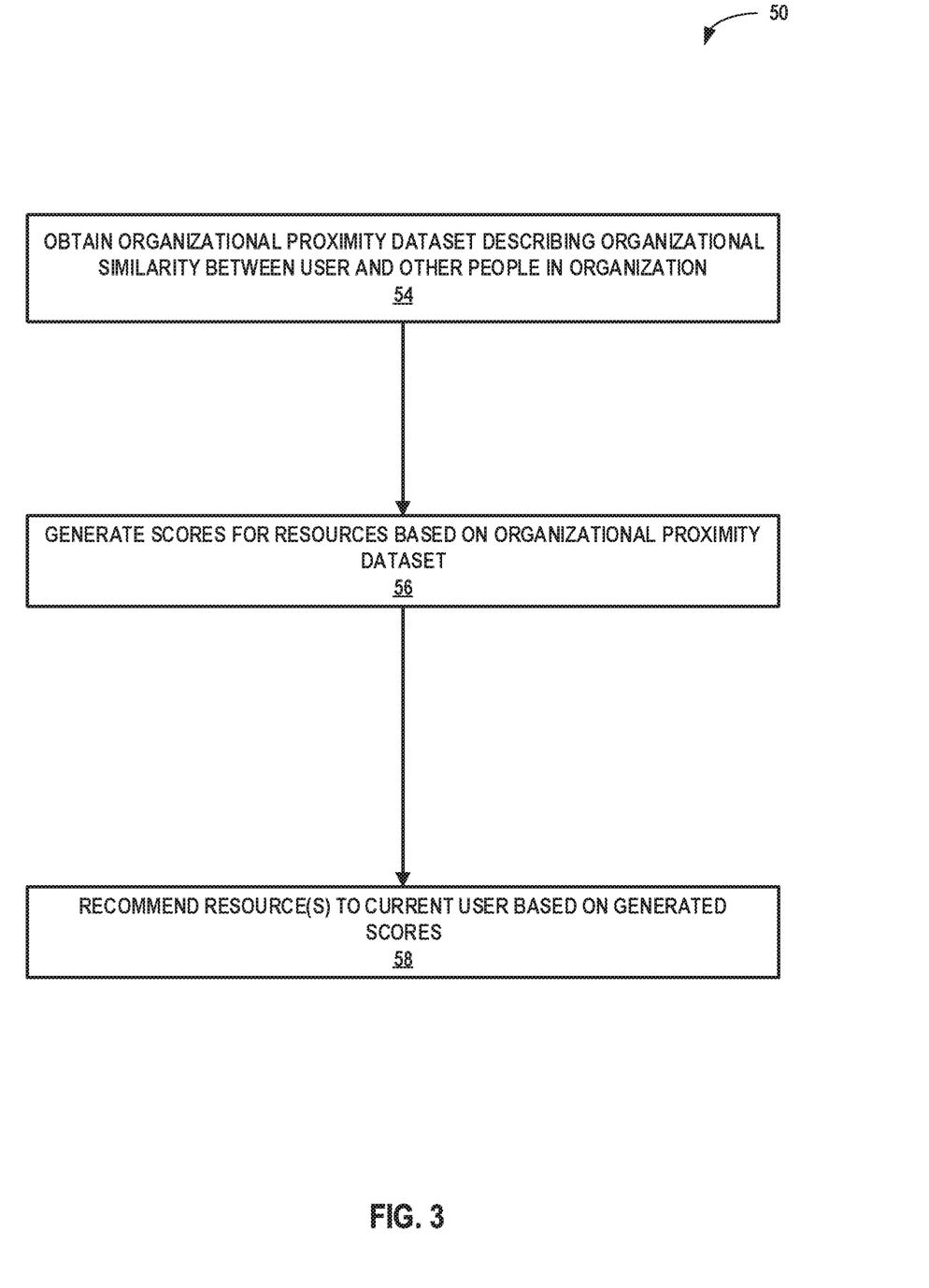
FIG. 3 is a flowchart illustrating an example process that the enterprise computing system of FIGS. 1 and 2 and/or components thereof may perform in accordance with aspects of this disclosure.

FIG. 3 is a flowchart illustrating an example process 50 that enterprise computing system 12 and/or components thereof may perform in accordance with aspects of this disclosure. Process 50 may begin with recommendation engine 14 obtaining an organizational proximity data describing organizational similarity between the user 32 and one or more other people within the organization that owns or operates enterprise computing system 12 (54). For example, recommendation engine 14 may obtain the organizational proximity dataset using the predetermined information available from organizational mapping 18.

Recommendation engine 14 may analyze the extracted portions of organizational mapping 18 based on one or more of: (i) degrees of separation between user 32 and each of the other people, (ii) respective geographic locations associated with user 32 and each of the other people, (iii) tenure information for user 32 and each of the other people with respect to the organization, or (iv) security clearance status information for user 32 and each of the other people. Recommendation engine 14 may leverage pre-mapped information available from organizational mapping 18 (which may be updated on a periodic basis to remain current), thereby mitigating computing resource consumption and time delays that would otherwise be incurred to analyze the organizational similarity between user 32 and one or more of the other people on a per-recommendation basis.

In turn, recommendation engine 14 may invoke resource scoring engine 26 to generate scores for a pool of resources based on the organizational proximity dataset generated for user 32 (56). The pool of resources for which resource scoring engine 26 generates scores at step 56 may represent a subset of the resources available from resource repository 16, with the subset representing a pool of resources being evaluated as candidates for recommendation to user 32 based on the most recent recommendation stimulus detected by enterprise computing system 12.

Recommendation engine 14 may recommend one or more resources of the evaluated pool of resources to user 32 based on the generated scores (58). For example, recommendation engine 14 may recommend those resources of the evaluated pool that receive the highest OPS values as calculated using equation (5) above.

Figure 4:
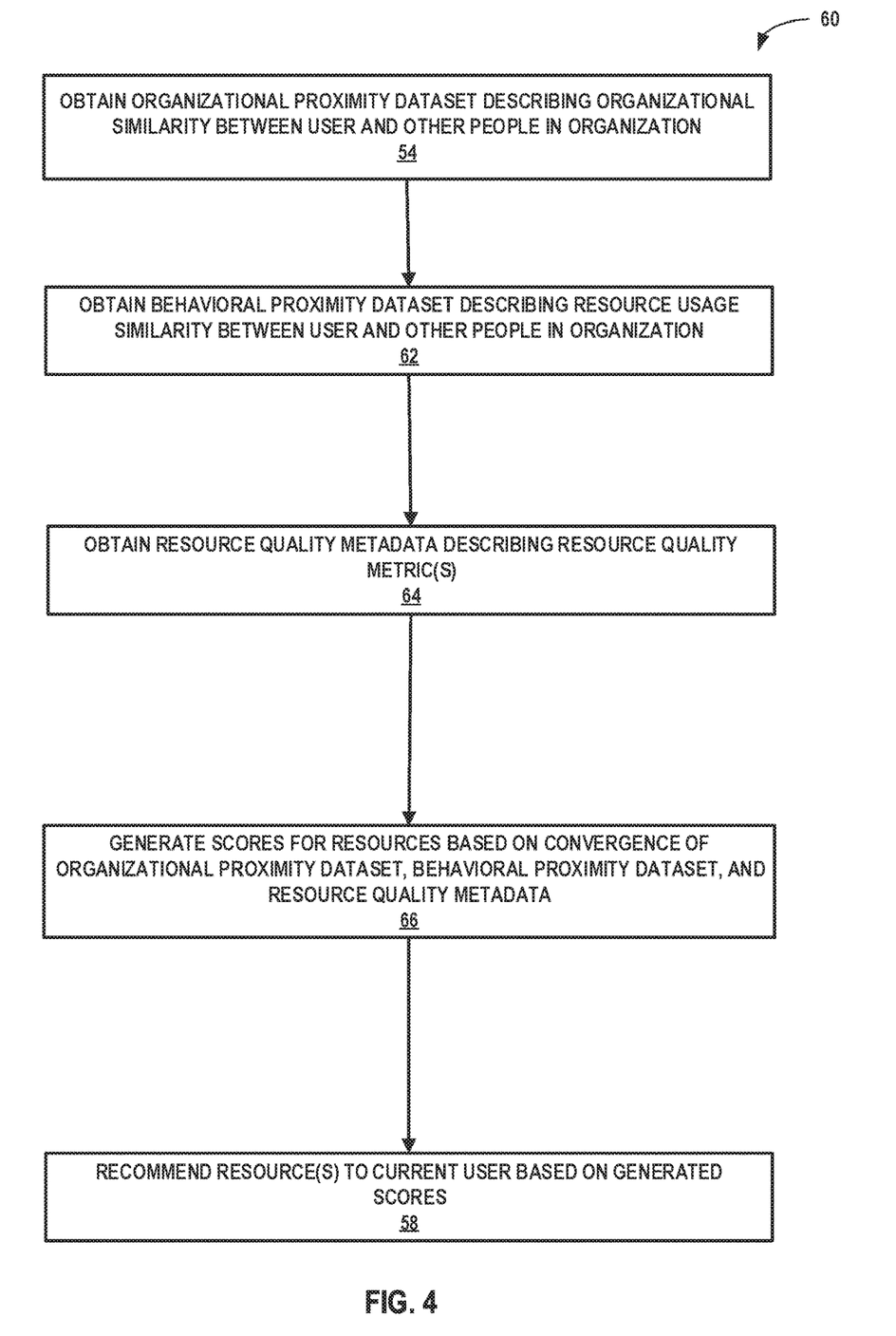
FIG. 4 is a flowchart illustrating an example process that the enterprise computing system of FIGS. 1 and 2 and/or components thereof may perform to augment the organizational proximity-based recommendation techniques of the process of FIG. 3 with one or more additional datasets.

FIG. 4 is a flowchart illustrating an example process 60 that enterprise computing system and/or components thereof may perform to augment the organizational proximity-based recommendation techniques of process 50 with one or more additional datasets. Similarly numbered steps of FIGS. 3 and 4 are associated with generally corresponding functionalities, and are not described with respect to FIG. 4, for the sake of brevity. In the example of process 60, recommendation engine 14 may obtain a behavioral proximity dataset describing resource usage similarity between user 32 and the one or more other people (62), and may obtain resource quality metadata describing one or more quality metrics of the resources available from resource repository 16 (64).

Although steps 54, 62, and 64 are shown in a particular order in FIG. 4 as an example, it will be appreciated that recommendation engine 14 may perform steps 54, 62, and 64, in a variety of orders in different use case scenarios. Additionally, depending on availability of data from user behavioral data 22 and/or resource quality metadata 24, recommendation engine 14 may omit one of steps 62 or 64, if the requisite data is unavailable. Recommendation engine 14 may form the behavioral proximity dataset based on one or more of: (i) a respective influencer status of the one or more other people, or (ii) a Pearson score, which represents a percentage share of use of each resource of plurality in an aggregate usage of all of the plurality of resources with respect to each of the one or more other people. Recommendation engine 14 may form the resource quality metric(s) based on one or more of: (i) data quality associated with each of the plurality of resources under evaluation with respect to the needs of user 32, (ii) design quality associated with each of the plurality of resources under evaluation for recommendation to user 32, or (iii) generator influence associated with each resource of the plurality of resources under evaluation for recommendation.

In the example of FIG. 4, recommendation engine 14 invokes resource scoring engine 26 to generate the scores for each of the resources under evaluation for recommendation based on a combination of the organizational proximity dataset, the behavioral proximity dataset, and the resource quality metadata (66). In some use case scenarios, resource scoring engine 26 may assign an individual weighting (based on an importance determination) to each of the datasets in the final convergence represented in equation (14). Process 60 concludes with step 58, which is described with respect to FIG. 3 (but in this case, with an augmented set of scores). In cases in which resource scoring engine 26 assigns individual weightings to the datasets, resource scoring engine 26 may further comprising determining a respective organizational proximity score for the current user with respect to each of the one or more other people based on an individually weighted combination of: (i) the respective degrees of separation between user 32 and each of the one or more other people, (ii) the respective geographic locations associated with user 32 and the one or more other people, (iii) the tenure information for user 32 and the one or more other people with respect to the organization, and (iv) the security clearance status information for user 32 and the one or more other people. The weighted combination of these datasets may be formed, in one example, according to equation (14) above.

The techniques described in this disclosure may be implemented, at least in part, in hardware, software, firmware or any combination thereof. For example, various aspects of the described techniques may be implemented within one or more processors, including one or more microprocessors, DSPs, application specific integrated circuits (ASICs), field programmable gate arrays (FPGAs), processing circuitry (e.g., fixed function circuitry, programmable circuitry, or any combination of fixed function circuitry and programmable circuitry), or any other equivalent integrated logic circuitry or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components or integrated within common or separate hardware or software components.

If implemented in software, the functions may be stored on or transmitted over a computer-readable medium as one or more instructions or code, and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), processing circuitry (e.g., fixed function circuitry, programmable circuitry, or any combination of fixed function circuitry and programmable circuitry), or other equivalent integrated logic circuitry or discrete logic circuitry, as well as any combination of such components. Accordingly, the term "processor," as used herein may refer to any of the foregoing structures or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wired or wireless communication device, a microprocessor, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

What is claimed is:

1. A method for automatically providing individually customized recommendations of resources for consumption to a first user via a user-facing computing device, the method comprising:
   storing, by a computing system, in a resource repository, a plurality of resources previously accessed by one or more second users within an organization;
   obtaining, by the computing system, an organizational proximity dataset for the first user, wherein the organizational proximity dataset for the first user describes organizational similarity between the first user and the one or more second users within the organization based on a plurality of datasets within the organizational proximity dataset, the plurality of datasets comprising:
   (i) degrees of separation between the first user and at least one of the one or more second users associated with the respective resource, (ii) respective geographic locations associated with the first user and the at least one second user associated with the resource, (iii) tenure of the at least one second user associated with the resource with respect to the organization, and (iv) a security clearance status information for the at least one second user associated with the resource;
   generating, by the computing system, organization proximity scores for the plurality of resources based on the plurality of datasets, wherein generating the organization proximity scores for the plurality of resources comprises, for each resource of the plurality of resources:
   determining weights for the plurality of datasets respectively;

determining scores for the plurality of datasets respectively;
applying the weights to the scores to determine weighted scores for the plurality of datasets respectively; and
determining the organization proximity scores for the plurality of resources based on a combination of the weighted scores for the plurality of datasets;
determining recommendation scores for the plurality of resources based on the organizational proximity scores for the plurality of resources, respectively; and
in response to at least one of a user request for recommendation of resources, detection of a resource browsing interface, or resource viewing interface at the user-facing computing device, or a current time being within a certain time period before a task deadline:
recommending, by the computing system, one or more resources of the plurality of resources to the first user to view based on the recommendation scores generated for the plurality of resources; and
sending, by the computing system, the one or more recommended resources to the user-facing computing device via a communicative connection to enable the first user to view the one or more recommended resources.

2. The method of claim 1,
wherein the scores for the plurality of datasets include a score based on a geographic distance from the first user to the at least one second user associated with the resource.

3. The method of claim 1, wherein the scores for the two plurality of datasets include a score based on a behavioral proximity dataset describing resource usage similarity between the first user and the at least one second user associated with the resource based on one or more of: (i) a respective influencer status of the at least one second user, or (ii) a percentage share of use of each resource of the plurality of resources in an aggregate usage of all of the plurality of resources with respect to the at least one second user.

4. The method of claim 1, wherein the method further comprises: obtaining, by the computing system, a behavioral proximity dataset describing resource usage similarity between the first user and the at least one of the one or more second users within the organization based on a respective influencer status of the at least one second user, and for each resource of the plurality of resources:
determining, by the computing system, a first weight for the organizational proximity dataset;
determining, by the computing system, a weighted organization proximity score by applying the first weight to the organization proximity score for the resource;
determining, by the computing system, a behavioral proximity score for the resource based on the behavioral proximity dataset;
determining, by the computing system, a second weight for the behavioral proximity dataset; and
determining, by the computing system, a weighted behavioral proximity score by applying the second weight to the behavioral proximity score,
wherein determining the recommendation score for the respective resource comprises determining, by the computing system, the recommendation score for the respective resource based on the weighted organizational proximity score and the weighted behavioral proximity score.

5. The method of claim 1, wherein the method further comprises:
obtaining, by the computing system, resource quality metadata describing one or more quality metrics of the plurality of resources based on one or more of: (i) data quality associated with each of the plurality of resources with respect to the first user, (ii) design quality associated with each resource of the plurality of resources, or (iii) generator influence describing a number of views associated with each resource of the plurality of resources, for each resource of the plurality of resources:
determining, by the computing system, a first weight for the organizational proximity dataset;
determining, by the computing system, a weighted organization proximity score by applying the first weight to the organization proximity score for the resource;
determining, by the computing system, a resource quality score for the resource based on the resource quality metadata;
determining, by the computing system, a second weight for the resource quality score; and
determining, by the computing system, a weighted resource quality score by applying the second weight to the resource quality score,
wherein determining the recommendation score for the respective resource comprises determining, by the computing system, the recommendation score for the respective resource based on the weighted organizational proximity score and the weighted resource quality score.

6. The method of claim 1, further comprising obtaining, by the computing system, resource quality metadata describing one or more quality metrics of the resources based on a design quality associated with each of the plurality of resources, for each resource of the plurality of resources:
determining, by the computing system, a first weight for the organizational proximity dataset;
determining, by the computing system, a weighted organization proximity score by applying the first weight to the organization proximity score for the resource;
determining, by the computing system, a resource quality score for the resource based on the resource quality metadata;
determining, by the computing system, a second weight for the resource quality score; and
determining, by the computing system, a weighted resource quality score by applying the second weight to the resource quality score,
wherein determining the recommendation score for the respective resource comprises-determining, by the computing system, the recommendation score for the respective resource based on the weighted organizational proximity score and the weighted resource quality score.

7. A computing system configured to automatically provide individually customized recommendations of resources for consumption to a first user via a user-facing computing device, the computing system comprising:
a memory configured to:
store a plurality of resources previously accessed by one or more second users within an organization; and
store an organizational proximity dataset for the first user, wherein the organizational proximity dataset for the first user describes organizational similarity between the first user and the one or more second users within the organization
based on a plurality of datasets within the organizational proximity dataset, the plurality of datasets comprising: (i) degrees of separation between the first user and at least one of the one or more second users associated with the resource, (ii) respective geographic locations associated with the first user and the at least one second user associated with the resource, (iii) tenure for the first user and the at least one second user associated with the resource with respect to the organization, and (iv) a security clearance status for the at least one second user associated with the resource;
generate organization proximity scores for the plurality of resources based on the plurality of datasets, wherein to generate the organization proximity scores for the plurality of resources comprises, a processing circuitry is configured to, for each resource of the plurality of resources:
   determine weights for the plurality of datasets respectively;
   determine scores for the plurality of datasets respectively;
   apply the weights to the scores to determine weighted scores for the plurality of datasets respectively; and
   determine the organization proximity scores for the resource based on a respective combination of the weights scores for the plurality of datasets;
determine recommendation scores for the plurality of resources based on the organizational proximity scores for the plurality of resources, respectively; and
in response to one or more of: a user request for recommendations of resources, detection of a resource browsing interface or resource viewing interface at the user-facing computing device, or a current time being within a certain time period before a task deadline:
   recommend one or more resources of the plurality of resources to the first user to view based on the recommendation scores generated for the plurality of resources; and
   send the one or more recommended resources to the user-facing computing device via a communicative connection to enable the first user to view the one or more recommended resources.

8. The computing system of claim 7, wherein the scores for the plurality of datasets include a score based on a geographic distance from the first user to the at least one second user associated with the resource.

9. The computing system of claim 7, wherein the scores for the plurality of datasets include a score based on a behavioral proximity dataset describing resource usage similarity between the first user and the at least one second user associated with the resource based on one or more of: (i) a respective influencer status of the at least one second user, or (ii) a percentage share of use of each of the resources in an aggregate usage of all of the plurality of resources with respect to the at least one second user.

10. The computing system of claim 7,
wherein the memory is further configured to store a behavioral proximity dataset describing resource usage similarity between the first user and the one or more second users within the organization-based on a respective influencer status of the one or more second users, and
wherein the processing circuitry is configured to, for each resource of the plurality of resources:
   determine a first weight for the organizational proximity dataset;
   determine, a weighted organization proximity score by applying the first weight to the organization proximity score for the resource;
   determine a behavioral proximity score for the resource based on the behavioral proximity dataset;
   determine a second weight for the behavioral proximity dataset; and
   determine a weighted behavioral proximity score applying the second weight to the behavioral proximity score,
   wherein to determine the recommendation score for the respective resource, the processing circuitry is configured to determine the recommendation score for the respective resource based on the weighted organizational proximity score and the weighted behavioral proximity score.

11. The computing system of claim 7, wherein the memory is further configured to store resource quality metadata describing one or more quality metrics of the plurality of resources based on one or more of: (i) data quality associated with each of the plurality of resources with respect to the first user, (ii) design quality associated with each of the plurality of resources, or (iii) generator influence describing a number of views associated with each resource of the plurality of resources, and
wherein the processing circuitry is configured to, for each resource of the plurality of resources:
   determine a first weight for the organizational proximity dataset;
   determining, by the computing system, a weighted organization proximity score by applying the first weight to the organization proximity score for the resource;
   determine a resource quality score for the resource based on the resource quality metadata;
   determine a second weight for the resource quality score; and
   determine a weighted resource quality score by applying the second weight for the resource quality score to the resource quality score,
   wherein to determine the recommendation score for the respective resource, the processing circuitry is configured to determine the recommendation score for the respective resource based on the weighted organizational proximity score and the weighted resource quality score.

12. The computing system of claim 7, wherein the memory is further configured to store resource quality metadata describing one or more quality metrics of the plurality of resources based on a design quality associated with each of the plurality of resources, and
wherein the processing circuitry is configured to, for each resource of the plurality of resources:
   determine a first weight for the organizational proximity dataset;
   determining, by the computing system, a weighted organization proximity score by applying the first weight to the organization proximity score for the resource;
   determine a resource quality score for the resource based on the resource quality metadata;
   determine a second weight for the resource quality score; and determine a weighted resource quality score by applying the second weight for the resource quality score to the resource quality score, wherein to determine the recommendation score for the respective resource, the processing circuitry is configured to determine the recommendation score for the respective resource based on the weighted organizational proximity score and the weighted resource quality score.

13. A non-transitory computer-readable storage medium encoded with instructions configured to cause a computing system to automatically provide individually customized recommendations of resources for consumption to a first user via a user-facing computing device, that, when executed, cause processing circuitry of the computing system to:

store, in a resource repository, a plurality of resources previously accessed by one or more second users within an organization;

obtain an organizational proximity dataset for a first user, wherein the organizational proximity dataset for the current user describes organizational similarity between the first user and the one or more second users within the organization based on a plurality of datasets within the organizational proximity dataset, the plurality of datasets comprising:
(i) degrees of separation between the first user and at least one of the one or more second users associated with the resource, (ii) respective geographic locations associated with the first user and the at least one second user associated with the resource, (iii) tenure of the at least one second user associated with the resource with respect to the organization, and (iv) a security clearance status for the at least one second user associated with the resource;

generate organization proximity scores for the plurality of resources based on the plurality of datasets, wherein the instructions that cause the processing circuitry to generate the organization proximity scores for the plurality of resources comprises, for each resource of the plurality of resources, cause the processing circuitry to:
determine weights for the plurality of datasets respectively;
determine scores for the plurality of datasets respectively;
apply the weights to the scores to determine weighted scores for the plurality of datasets respectively; and
determine the organization proximity score for the resource based on a combination of the weighted scores for the plurality of datasets;

determine recommendation scores for the plurality of resources based on the organizational proximity scores for the plurality of resources, respectively; and in response to one or more of: a user request for recommendations of resources, detection of a resource browsing interface or resource viewing interface at a user-facing computing device, or a current time being within a certain time period before a task deadline:
recommend one or more resources of the plurality of resources to the first user to view based on the recommendation scores generated for the plurality of resources; and
send the one or more recommended resources to the user-facing computing device via a communicative connection to enable the first user to view the one or more recommended resources.

14. The non-transitory computer-readable storage medium of claim 13, further encoded with instructions that, when executed, cause the processing circuitry to obtain resource quality metadata describing one or more quality metrics of the plurality of resources based on one or more of: (i) data quality associated with each of the plurality of resources with respect to the first user, (ii) design quality associated with each of the plurality of resources, or (iii) generator influence describing a number of views associated with each resource of the plurality of resources, and wherein the instructions cause the processing circuitry to, for each resource of the plurality of resources:
determine a first weight for the organizational proximity dataset;
determining, by the computing system, a weighted organization proximity score by applying the first weight to the organization proximity score for the resource;
determine a resource quality score for the resource based on the resource quality metadata;
determine a second weight for the resource quality score; and
determine a weighted resource quality score by applying the second weight for the resource quality score to the resource quality score,
wherein the instructions cause the processing circuitry to determine the recommendation score for the respective resource by determining the recommendation score for the respective resource based on the weighted organizational proximity score and the weighted resource quality score.

15. The non-transitory computer-readable storage medium of claim 13, wherein the scores for the plurality of datasets include a score based on a behavioral proximity dataset describing resource usage similarity between the first user and the at least one second user associated with the resource based on one or more of: (i) a respective influencer status of the at least one second user, or (ii) a percentage share of use of each of the resources in an aggregate usage of all of the plurality of resources with respect to the at least one second user.

* * * * *

UNITED STATES PATENT AND TRADEMARK OFFICE
CERTIFICATE OF CORRECTION

| | |
|---|---|
| PATENT NO. | : 11,829,911 B2 |
| APPLICATION NO. | : 16/870630 |
| DATED | : November 28, 2023 |
| INVENTOR(S) | : Kleine et al. |

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 130 days.

Signed and Sealed this
First Day of July, 2025

Coke Morgan Stewart
*Acting Director of the United States Patent and Trademark Office*